US006971027B1

(12) United States Patent
Veneklase (10) Patent No.: US 6,971,027 B1
(45) Date of Patent: Nov. 29, 2005

(54) COMPUTER SECURITY SYSTEM (76) Inventor: Brian J. Veneklase, 5011 Ashton Audrey, San Antonio, TX (US) 78249

( * ) Notice: Subject to any disclaimer, the term of this patent is extended or adjusted under 35 U.S.C. 154(b) by 0 days.

(21) Appl. No.: 09/282,954

(22) Filed: Apr. 1, 1999

(51) Int. Cl.$^7$ ................ G06F 11/30; G06F 15/173; G06F 15/16; G06F 12/00
(52) U.S. Cl. ............... 713/201; 713/200; 709/223; 709/224; 709/225; 709/226; 709/229; 711/100
(58) Field of Search ........ 713/200–202; 709/223–226, 709/229; 711/100

(56) References Cited

U.S. PATENT DOCUMENTS

| 4,484,306 A | | 11/1984 | Kulczyckyj et al. | |
|---|---|---|---|---|
| 4,779,224 A | | 10/1988 | Moseley et al. | |
| 4,910,772 A | * | 3/1990 | Matias et al. .................. | 380/2 |
| 5,081,675 A | * | 1/1992 | Kittirutsunetorn .......... | 713/190 |
| 5,226,080 A | | 7/1993 | Cole et al. | |
| 5,231,668 A | * | 7/1993 | Kravitz ........................ | 380/28 |
| 5,245,658 A | * | 9/1993 | Bush et al. .................... | 380/28 |
| 5,261,070 A | | 11/1993 | Ohta | |
| 5,303,303 A | * | 4/1994 | White ........................ | 713/160 |
| 5,375,243 A | | 12/1994 | Parzych et al. | |
| 5,475,762 A | | 12/1995 | Morisawa et al. | |
| 5,495,235 A | | 2/1996 | Durinovic-Johri et al. | |
| 5,566,169 A | | 10/1996 | Rangan et al. | |
| 5,623,637 A | | 4/1997 | Jones et al. | |
| 5,657,452 A | | 8/1997 | Kralowetz et al. | |
| 5,668,811 A | * | 9/1997 | Worsley et al. ............. | 370/424 |
| 5,682,475 A | | 10/1997 | Johnson et al. | |
| 5,684,951 A | | 11/1997 | Goldman et al. | |
| 5,852,711 A | * | 12/1998 | Campbell .................. | 358/1.18 |
| 5,881,226 A | | 3/1999 | Veneklase | |
| 6,088,047 A | * | 7/2000 | Bose et al. .................. | 345/547 |
| 6,097,927 A | * | 8/2000 | LaDue ........................ | 434/308 |
| 6,771,597 B2 | * | 8/2004 | Makansi et al. ............. | 370/230 |

FOREIGN PATENT DOCUMENTS

| EP | 0 558 326 A1 | 9/1992 |
|---|---|---|
| EP | 0 844 551 A2 | 5/1998 |
| EP | 0 844 551 A3 | 7/1998 |
| GB | 2 229 020 A | 9/1990 |
| WO | WO 95/19593 | 7/1995 |

OTHER PUBLICATIONS

Cit-Alcatel, Data Transmission Error Corrector.*
European Search Report, European Patent Office, Feb., 1998.
Advanced Computer Architecture Parallelism, Scalability, Programmability, Kai Hwang, 1993.
European Search Report, European Patent Office, May 15, 1998.

* cited by examiner

Primary Examiner—Ayaz Sheikh
Assistant Examiner—Jenise Jackson
(74) Attorney, Agent, or Firm—Law Offices of John Chupa & Associates, PC (57) ABSTRACT

A networked computer system 10 having enhanced communications security aspects.

3 Claims, 5 Drawing Sheets

COMPUTER SECURITY SYSTEM

BACKGROUND OF THE INVENTION

1. Field of the Invention

This invention generally relates to a secure communications methodology and to a computer system using such a methodology, and more particularly to a computer system having improved communications and security features, the communications and security features being adapted for use in a wide variety of applications and computer systems and being further adapted to allow for relatively secure and selective computer, data, and other types of information communication to occur.

2. Background

Computer systems have become an essential tool in most of today's business activities. Importantly and by way of example, these computer systems have become critical to the on-going overall operation of many important industries, such as and without limitation, the banking, finance, travel, and commodities trading industries. It has been widely noted that while these computer systems have become quite sophisticated they have remained and/or have become concomitantly quite susceptible to unwanted and undesired "break-ins", data and communication "capture", and security "failures" resulting in an undesirable disruption to the various businesses in which they are employed and resulting in a loss and/or an undesired modification/extraction of sensitive data. In fact, many industry observers have consistently noted that undesired interception of data communications is a very serious problem facing each and every business utilizing any form of networked computer and/or networked communications.

To address these problems and security threats many types of communications systems and methods have been developed in an attempt to reduce the number of unauthorized individuals obtaining access to the "target" system (e.g. the desired recipient of the generated communication information) and/or to somehow intentionally alter and/or modify the content of the transmitted message in a manner in which the message and/or data is "scrambled" or made allegedly "indecipherable" to someone not having the knowledge of the manner in which the received data is to be deciphered or "descrambled". In this manner, these prior systems and methodologies attempted to make it difficult for the unauthorized recipient of the message to understand and/or comprehend the meaning or actual information content contained within the communicated message.

While somewhat effective, many of these prior systems and prior methodologies have failed to adequately and desirably protect the "target" computer system against unwanted and undesired intrusion and have failed to adequately "mask" and/or "protect" the transmitted and generated data in a manner which adequately and desirably protects the data against unwanted "extraction", "descrambling" and "decoding". In sum, none of these prior computer systems and/or security and/or communications methodologies have adequately provided a desired level of security protection necessary to adequately and desirably ensure against unwanted system intrusion/modification and/or against unwanted and undesired communications interception, thereby substantially guarding against undesired system disruption and/or undesired data reception.

There is therefore a need for an improved computer security system and/or a computer and/or communications system methodology which increases the overall probability for secure communications and for secure system processing and operation while concomitantly reducing the overall probability of undesired and unwanted data extraction. Applicant's invention addresses these needs and overcomes the various drawbacks of these prior communications and computer systems.

SUMMARY OF THE INVENTION

It is a first object of the invention to provide a computer and/or communications system and/or methodology which overcomes some or all of the drawbacks of the prior art.

It is a second object of the invention to provide a networked computer system having enhanced security features and which overcomes some or all of the drawbacks of the prior art systems.

It is a third object of the invention to provide a communications methodology which allows for the relatively secure transmission and reception of data and which overcomes at least some of the drawbacks of the prior art.

It is a fourth object of the invention to provide a communications methodology which overcomes some or all of the various drawbacks of the prior art and which further allows for the selective and relatively secure communication of data, and which is further adapted for selective use on or in combination with a wide variety of computer and communication systems, including those conventional and commercially available systems used by a wide variety of businesses and other organizations.

It is a fifth object of the present invention to provide a computer and/or communications system which overcomes some or all of the various disadvantages of the prior art and which further includes a method to cause the communicated data to identify only memory locations within the central processor assembly of the "target" computer system. According to this fifth aspect of the present invention, the identified memory locations selectively house and/or store predetermined commands which, once addressed by the communicated data and/or by the central processor of the target computer system in response to the receipt of the communicated data, causes the central processor and/or other components of the processor assembly to perform one or more predetermined and desired functions and/or actions in a desired sequence of operations and/or time.

It is a sixth object of the present invention to provide a communications methodology which provides for the use of a plurality of filters which cooperate to alter and/or modify received data according to a predetermined and/or desired methodology and thereafter to transmit the modified data and/or information, thereby resulting in the communication of relatively secured data transmissions to one or more target computer systems.

It is a seventh object of the present invention to provide a data communications system and methodology which provides for the receipt of certain data and which further provides for the selective parsing and independent transmission of the parsed data according to a desired algorithm, and the utilization of a plurality of data paths and/or channels, thereby making it relatively difficult to reconstitute the entire generated data stream and increasing the overall probability that the entire transmitted data stream will not be undesirably captured.

According to a first aspect of the present invention a data or "selection/recognition" grid is provided which selectively defines those elements and/or portions of a received set of data (e.g. a "signaling" or "initiating" computer system) which comprise a message to be communicated by the sender of the set of data to the recipient and/or "target"

computer system. The "recognition" grid may constitute an algorithm or a physical and portable template which may be selectively placed upon a computer screen monitor and which may be used to define those portions of the screen from which data/information is to be read or extracted from.

According to a second aspect of the present invention a communications methodology is provided which requires the receipt and/or generation of a data stream and the subsequent multiplexing of the received and/or generated data into a plurality of separate data channels. In one embodiment of the invention, each of the channels is adapted to be transmitted over and/or by the use of separate and/or independent communications mediums. The communications methodology of this second aspect of the present invention also requires and/or provides for the subsequent receipt of transmitted data respectively flowing through the plurality of data communication channels and/or separate mediums and the subsequent reconstitution of the received data into relatively about the same order and/or sequence that it was originally generated and/or received within. The reconstituted data may then be processed by the "target" computer system.

According to a third aspect of the present invention a communications methodology is provided which requires and/or provides that data which is generated by a signaling computer and/or signaling computer system to refer to and/or point to locations within a computer processor contained and operable within a "target" computer system. In this manner, unauthorized and/or undesired receipt of the generated data does not provide for and/or comprise actual receipt of the commands and/or data which, according to this aspect of the present invention, is stored in the memory sites and/or locations of the "target" computer system.

According to a fourth aspect of the present invention a communications methodology is provided which provides for a plurality of filters which are each adapted to be in a communications relationship and which are each adapted to alter and/or modify received data in a certain predetermined manner and to later transmit and/or communicate this altered information to another filter and/or to a "target" computer.

According to a fifth aspect of the present invention a computer system is provided which includes at least one of the communications methodologies which have been previously delineated and which comprise and/or form the afore-described first, second, third, and/or fourth aspects of the preferred embodiment of the invention. Accordingly, as should be apparent to one of ordinary skill in the art, each of the foregoing communications methodologies may and are specifically and selectively adapted and designed to be selectively used in combination with one or more conventional and/or commercially available computer systems and are not intended to be limited to use with a particular type of computer system. Moreover, each of the previously delineated aspects of the present invention may be utilized in selective combination, thereby further increasing the overall security of the computer system.

Further objects, features, and advantages of the present invention will become apparent from a consideration of the following description and the appended claims when taken in conjunction with the accompanying drawings.

BRIEF DESCRIPTION OF THE DRAWINGS

The drawings which are included within this application for patent are intended to aid in the understanding of the various preferred embodiments of the invention and are not intended, nor shall they be construed, as limiting the scope of the claimed inventions in any manner whatsoever. Accordingly, the attached drawings generally refer to and/or depict the following:

DETAILED DESCRIPTION OF THE PREFERRED EMBODIMENT OF THE INVENTION

Figure 1:
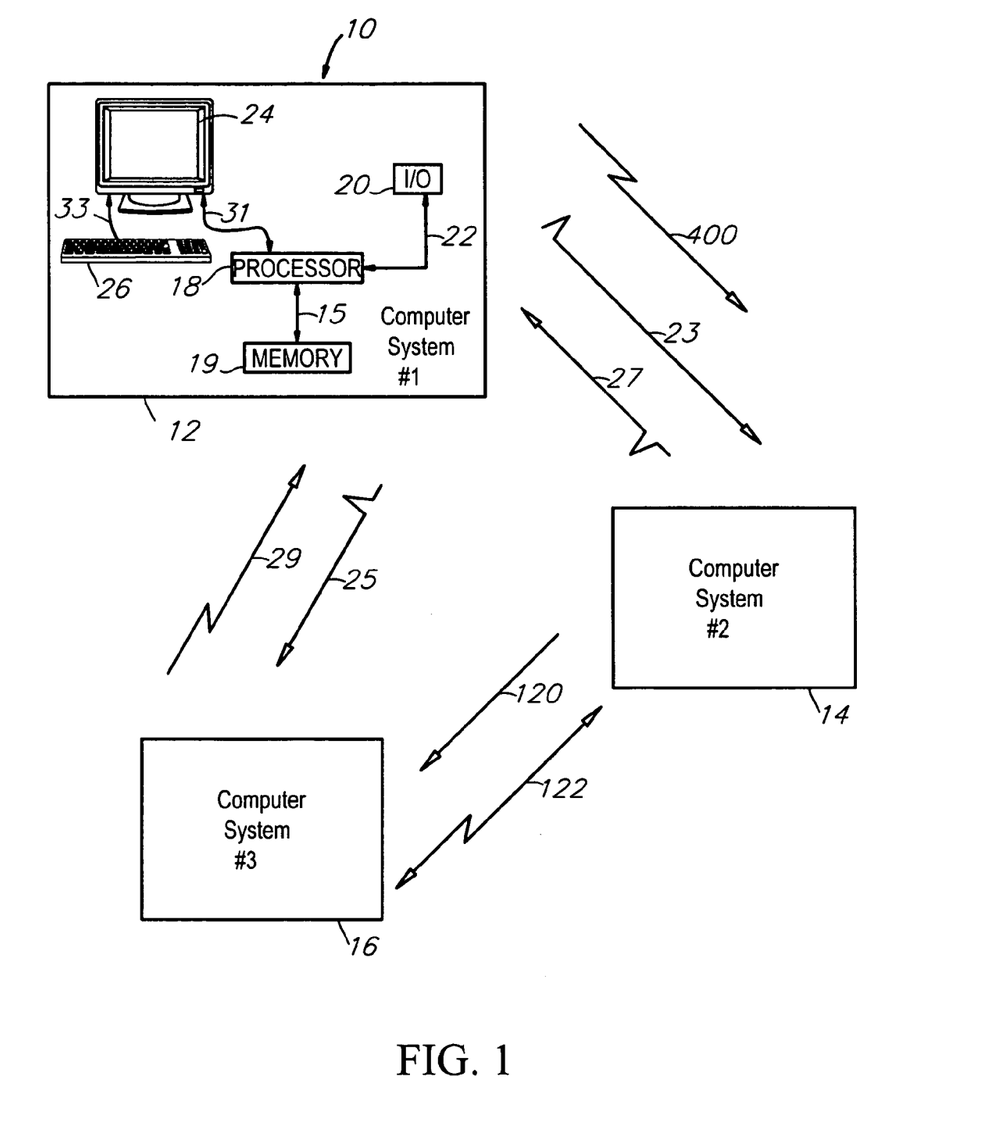
FIG. 1 is a block diagram illustrating a plurality of computer systems which are in a selective communication and/or informational transfer relationship and which are adapted to incorporate one or more of the communications methodologies and/or aspects associated with and/or forming the various embodiments of this invention.

Referring now to FIG. 1 there is shown a computer networking communications/information transfer system 10 having, in one embodiment, a plurality of conventional and commercially available computers 12, 14 and 16 which, in one embodiment of the invention, are each substantially identical and in a selective communications and/or informational transfer and/or informational "sharing" relationship. By way of example and without limitation, computer systems 12, 14 and 16 each comprise a commercially available Aptiva® system produced by the IBM Corporation of Armonk, N.Y. Alternatively, these computer systems comprise a conventional and commercially available Model 2256 Presario® System manufactured by Compaq Computer or virtually any other conventional and commercially available computer system. It should be noted that while various components are pictured and explained with respect to computer system 10, these components are equally applicable and/or found within computer systems 14 and 16. These computer components are described below, as are the various communications methodologies of the invention.

Figure 7:
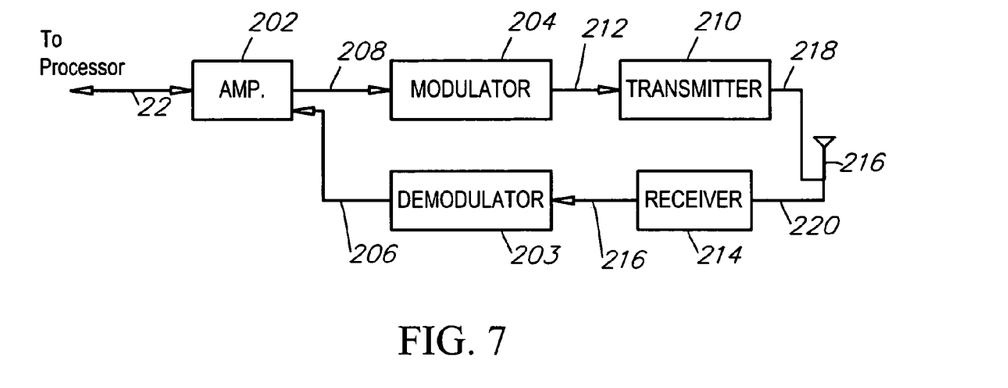
FIG. 7 is a block diagram of the input/output driver shown in FIG. 1.

In one embodiment of the invention, each of the computer systems 12, 14 and 16 includes a processor 18, such as a commercially available Pentium® processor manufactured by the Intel Corporation of Corvalis, Oreg. which operates under stored program control. Further, in one embodiment of the invention, each of these computer systems 12, 14 and 16 further includes at least one commercially available and conventional memory 19 which is communicatively and electronically coupled to the processor 18 by means of bus 15 and a conventional and commercially available input/ output driver device 20. In one embodiment of the invention, driver device 20 comprises, as is best shown in FIG. 7, an amplifier 202 which is physically and electrically coupled to processor 18 through bus 22 and which is further physically and electrically coupled to demodulator 203 and to modulator 204 by respective busses 206, 208. Modulator 204 is physically and electrically coupled to transmitter 210 by bus 212 and demodulator 203 is physically and electrically coupled to receiver 214 by means of bus 216. Transmitter 210 and receiver 214 are physically and electrically coupled to antenna 216 by respective busses 218, 220. The processor 18, memory 19, driver 20, monitor 24, and keyboard 26 may be considered to be and/or referred to as "componentry" of the computer system 12.

In operation, data in the form of electrical/electronic and/or optical signals emanating from processor 18, memory 15, and/or from keyboard 26 is electronically and/or optically amplified by amplifier 202 and coupled to modulator 204 where it is modulated and used to construct electrically/electronic/electromagnetic/ and/or optical signals 23, 25. These signals, as shown, emanate from driver 20 by transmitter 210 and antenna 216.

In this manner, computer 12 selectively communicates and/or transfers information with computer 14, 16. Additionally, electrical/electronic/electromagnetic/ and/or optical informational signals 27, 29 emanating from respective computers 14, 16 are received by antenna 216 and physically and electronically/optically coupled to receiver 214 and demodulator 203 by the use of busses 220 and 216. The demodulated signal is then amplified by amplifier 202 and the amplified demodulated signal is physically and electronically/optically coupled to processor 18 by the use of bus 220. In this manner, computer systems 14, 16 selectively communicate with computer system 10. Such signals 23, 25, 27, 29, should be apparent to those skilled in this art, usually contain information which may be undesirably intercepted by a thief and/or by a "computer hacker".

In the foregoing manner these computer systems 12, 14 and 16 may be and are adapted to be in a selective communication and/or informational transfer and/or "sharing" relationship. Moreover, it should be apparent to those skilled in this art that the previous description of the various components and operation of computer system 12 is equally applicable and substantially similar to the componentry and operation of systems 14 and 16. Moreover, it should be further apparent to those skilled in the art that computer systems 12, 14 and 16 may each be substantially similar to those described within the text entitled "Advanced Computer Architecture", authored by Kai Hwang, produced by McGraw-Hill having reference number ISBN-0-07-031622-8 and which is fully and completely incorporated herein by reference, word for word and paragraph for paragraph.

Further, as shown in FIG. 1, each of the computer systems 12, 14 and 16 further include a monitor 24 which is electronically and communicatively coupled to processor 18 by means of bus 31 and a keyboard 26 which is communicatively and electronically coupled to processor 16 by means of bus 33. Monitor 24 and keyboard 26 allow a user of each of the computer systems 12, 14 and 16 to selectively generate signals 23, 25, 27, 29, 400, and 120 and 122, to input and receive data and information from each of the computer systems 12, 14 and 16 and to interact with these systems 12, 14 and 16. Moreover, computer systems 14 and 16 are also in a communications relationship as shown by signals 120, 122 which are respectively generated by computers 14, 16. As used throughout this application the term "target" system refers to a computer system which is destined or "targeted" to receive a signal transmission 23, 25, 27, 29, 400, 120, 122. The term "signaling" system refers to the computer system which generates these signals and transmits these signals to the target computer system. As should be apparent to those of ordinary skill in the art, these computer systems 12, 14 and 16 are conventional and commercially available systems which are adapted to allow the selective generation and communication of data and other types of information. It is to these conventional and commercially available computer systems to which Applicant's invention is directed according to a first object of the invention. Notwithstanding this aspect of the invention, it should also be noted that Applicant's invention is also applicable to other proprietary computer systems, thereby increasing the overall utility of Applicant's invention.

Figure 2:
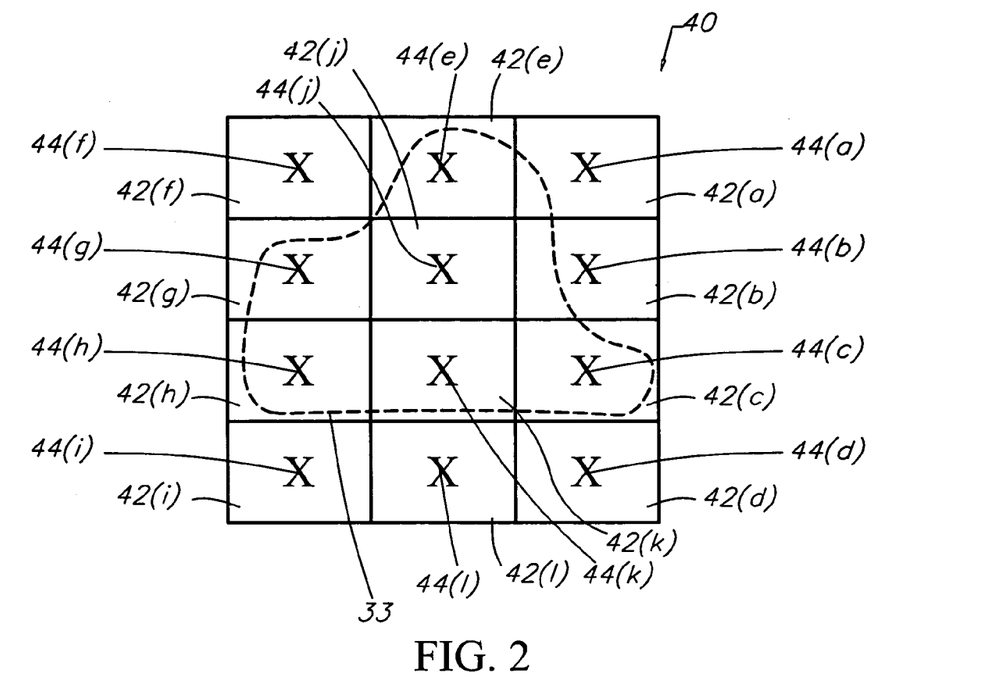
FIG. 2 is a block diagram illustrating the use of a recognition grid to select and/or to define a portion of received data, according to one embodiment of the present invention.

Referring now to FIG. 2, there is illustratively shown a portion 40 of memory 19 having a plurality of memory locations 42(a)–42(l) which are each adapted to selectively allow electronic data (e.g. numerical data or command type data) to be stored therein. This stored data may emanate from keyboard 26 (e.g. being "input" into the memory 19 by a system user). Alternatively and/or additionally this data may be received from the other computer systems 14, 16 by means of signals 27 and 29, and/or placed there by processor 18. As shown, memory locations 42(a)–42(l) each contain respectively received data 44(a)–44(l) which is received from keyboard 26 or from the other computer system 14, 16 and is subsequently selected according to the recognition grid aspects of at least one aspect of the present invention.

Specifically, the recognition grid, in one embodiment of the invention, comprises a set of predetermined memory locations which are, for example and without limitation, stored within processor 18 and which cooperatively define those memory locations which the computer processor 18 uses to select operating commands or data from. As should be apparent to those of ordinary skill in the art, every computer processor of the other computer system 14, 16 similarly utilizes/employs this feature.

That is, according to this aspect of the present invention, each processor of each of the communicating computer systems 12, 14, 16 has a set of known and predetermined memory locations which contain operational and/or command type data used to define the manner in which the processor performs its functions and/or its operations. In essence, according to this aspect of the invention, only certain memory locations 42(a)–42(l) represent "valid" locations (e.g. those locations that contain data to be used by the processor in defining its operations) for the storage of "real" or "operational" data which is to be read and acted upon by the processor 18. Moreover, in yet another embodiment of the invention, each of the communicating computer systems 12, 14, and 16 has knowledge of the storage sites for each of the computers 12, 14, and 16 associated with the sequence of operations to be accomplished by the respective computers and has knowledge of the sequence that the target computers use to read this data in. The signaling computer then attempts to place desired operational data in these locations according to the sequential pattern that the target computer utilizes to read the data from. For example, and without limitation, if a signaling computer desired to have a target computer read data $y_1$, $y_2$, $y_3$, in that particular sequence, and the signaling computer knows that the target computer recognizes operational data within memory locations 42(a), 42(b), and 42(c) and reads such operational data in this sequence, the signaling computer plans "$y_1$" with memory location 42(a); "y$_2$" within memory location 42(b); and "y$_3$" within memory location 42(c) of the target computer.

To understand this first aspect or embodiment of Applicant's invention it is first necessary to understand that in one embodiment of the invention, the received data information is sequentially placed within certain memory locations of each target computer system 12, 14, 16 (e.g. beginning at the lowest numbered memory location 42(a) and sequentially continuing towards the highest numbered memory location 42(l)) according to the instant in time in which the data was received. This is, according to this embodiment, the first (in time) data portion which is received by a target computer system 12, 14, 16 is placed in the lowest numbered memory location 42(a) which is available. The last (in time) portion of the received data is also placed into the lowest available memory location which is used to contain the received data. Since the last, in time, data is received after a sequence of data has already been received, this last received portion is placed into the highest position of any of the data received in that particular data reception sequence.

For example and without limitation, according to this aspect of the present invention, the first bit of data received is placed into the lowest numbered memory location 42(a). The next data bit received is placed into the next higher numbered memory location 42(b). The process is repeated until all of the received data bits are placed within memory locations or until all memory locations are utilized. After all of the received data 44(a)–44(l) is "stuffed" within these memory locations 42(a)–42(l), certain bits of the data 44(a)–44(l) are extracted according to the recognition grid algorithm developed by and explained by Applicant.

Particularly, this recognition "grid" algorithm (e.g. representatively shown by the closed geometric FIG. 33) selects and/or defines those memory locations 42(a)–42(l) representing "valid" or "operational data" and the order that the data is to be read from (e.g. the order that the data is "read from" does not necessarily need to be the order used to define how and/or the manner that the data is "stuffed" within memory). By way of example and without limitation recognition grid algorithm 33 defines data 44(c), 44(e), 44(g), 44(h), 44(j), and 44(k) as the operational data to be used by processor 18. Processor 18 is then, in one embodiment, directed to read the sequence of data beginning at the lowest memory position having "valid" data (e.g. 42(c)) and continuing in sequence until reaching the highest memory position having "valid" data (e.g. 42(k)). Here, in this example and without limitation. The sequence of operational steps performed by processor 18 is defined by the data sequence 44(c), 44(e), 44(g), 44(h), 44(j), and 44(k). In another embodiment, of the invention, the operational sequence is defined by the sequence of data represented by 44(k), 44(j), 44(h), 44(g), 44(e), and 44(c) or the exact opposite or "mirror image" of the sequence employed by the target computer system in the first example. It should be understood that in an alternate embodiment of the invention each memory location may contain multiple bits of information.

This algorithm, in one embodiment and without limitation, is present in each of the computer systems 12, 14 and 16. Moreover, in this embodiment, every communicating computer system 12, 14, and 16 has knowledge of those memory locations which any "target" computer system regards as containing or adapted to contain "real" data (e.g. those data bits selected by the respective recognition grid of the "target" computer system), has knowledge of the sequence employed by each of the communicating computer systems 12, 14, 16 to "read" data from these "valid" locations, and has further knowledge of the manner required to place certain data in these memory locations (e.g. each time slot defines a unique memory location and the process of "stuffing" memory locations begins at the lowest numbered memory locations with the first bit received and continues or progresses to the highest numbered memory location). Hence by way of example and without limitation, a transmitting or "signaling" computer system 12, 14, 16 which desires to place data within memory location 42(a), 42(d), and 42(e) of a "target" or receiving computer system 12, 14, 16 would ensure that the first, fourth, and fifth data bits of the transmitted signal contain the respective data that is desired to be placed within these locations. The remaining transmitted data bits are irrelevant to this communication methodology, according to this aspect of the invention. Moreover, if the "target" system 12, 14, 16 operated in accordance with the teachings of the first embodiment of the invention, the operational data sequence would be defined by the order of 42(a), 42(b), and 42(c).

In this manner, by way of a second example and without limitation, the "real" data or the actual operational data (shown for illustration purposes as 44(c), 44(e), 44(g), 44(h), 44(j), and 44(k)) that is desired to be communicated by and between the computers 12, 14 and 16 is "mixed" with other filler data (44(a), 44(b), 44(d), 44(f), 44(i) and 44(l)). Such "filler" data does not affect the operation of the target or receiving computer 12, 14, 16. Access to the transmitted data 44(a)–44(l) without knowledge of the recognition grid algorithm (e.g. those memory locations and associated data representing the "real" or processor operational data) would not allow an unauthorized recipient to gain knowledge of the actual communicated operational/control information and therefore provides a relatively secure communications methodology which may be used with conventional and commercially available computer systems 12, 14 and 16 as well as by proprietary computer systems. Importantly, it should be understood that any number of storage sites 42(a)–42(l) may be designated by the "grid" algorithm and the data 44(a)–44(l) may be "read" from these sites in any order and according to any method, the only requirement being that each communicating or signaling computer system 12, 14, 16 have knowledge of those respective memory locations 42(a)–42(f) which each of the communicating target computer systems 12, 14, 16 regards as containing operational data and the respective sequence that each of the target computer systems reads the data from.

Figure 6:
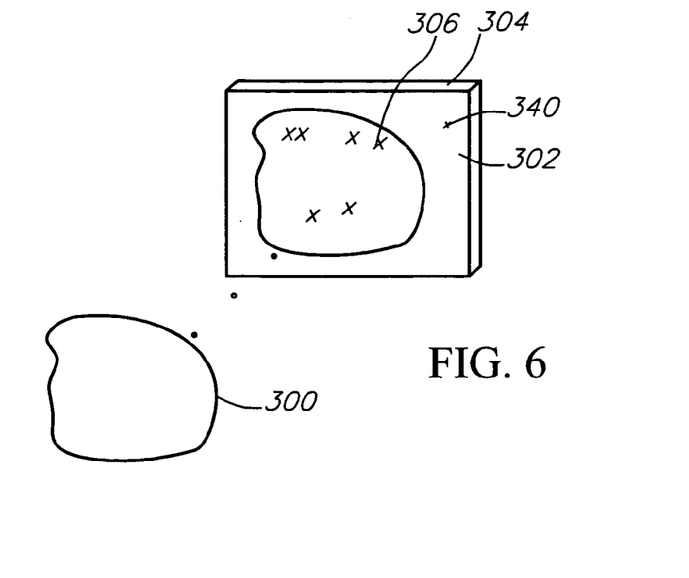
FIG. 6 is a perspective view of a fifth embodiment of the invention.

According to another embodiment of the invention, as best shown in FIG. 6, the recognition grid may comprise a generally flat and transparent template 300 which is adapted to be placed upon the generally flat surface 302 of a computer monitor and/or screen 304 which is selectively adapted to display data 306. In this manner, a user of screen 304 simply and physically places the template 300 over the screen in order to determine the data which is "valid". The "valid" data appears underneath of the template 300. Data, such as data 340, not appearing under the template is not considered "valid" and is irrelevant. "Valid" or operational data may be ensured to be viewed at only within the boundaries of the template 300 since positional placement upon screen 302 is directly related to positional placement within the memory 40. Hence, the shape of the template 300 defines which memory locations contain operational data. Alternatively, a user could just remember the pattern and simply read those locations included within the pattern. In this manner, the use of a separate template is obviated.

In yet an alternate embodiment of the invention, the recognition grid information (e.g. the identity of "valid" memory locations and the sequence of "reading" these locations) may be transmitted by a signaling computer 12, 14, 16 to a target computer 12, 14, 16 by use of a separate channel or signal 400. In this manner, a thief or "hacker", in order to understand the entire content of the data transmitted between the computer systems would be required to capture both the data and the recognition grid signal. Moreover, the use of a separate channel 400 allows these memory locations and/or recognition grid algorithm to be dynamically modified and/or updated.

Figure 5:
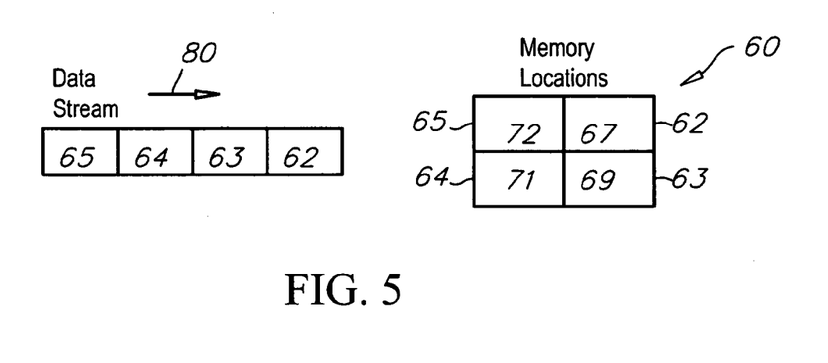
FIG. 5 is a block diagram illustrative of a fourth embodiment of the invention.

Referring now to FIG. 5, there is shown another aspect of the communications methodology of the present invention. Particularly, there is shown a portion 60 of memory 19 having a plurality of addressed memory locations 62, 63, 64, and 65 which each respectively contain command and central information and/or data 67, 69, 71 and 72. The term "command data" and/or "central information", as used in the description of this invention embodiment, means data which defines and/or represents certain actions which must be undertaken by the processor 18 and which is "read" or understood by the program resident within the processor 18.

According to this aspect of the present invention, the actual command data or other information desired to be presently communicated by and between each of the computer systems 12, 14 and 16 (e.g. illustrated as data 67, 69, 71 72) are resident within each of the memory locations of each of the "target" computer systems 12, 14, 16. In this embodiment, each of the computer systems 12, 14, 16 has knowledge of the contents of each memory location in each of the other computer systems 12, 14, 16 and thus needs to merely specify memory locations, according to this communications methodology, in order for the "target" computer system 12, 14, 16, to perform some action or some sequence of actions. The signaling computer 12, 14, 16 simply directs the target computer 12, 14, 16 to perform some function or operation which already resides within the target computer 12, 14, 16. In this manner, the transmitted communications signals 23, 25, 27, 29, 120 comprise and/or include data stream 80 which comprises and/or identifies only memory locations 62, 63, 64 and 65 of the target computer system 12, 14, 16. Hence, the unauthorized receipt of the communications signals 23, 25, 27, 29, 120 provides relatively little or no information concerning the actual data or information to be communicated (e.g. the actual data commands and/or actual information located within memory locations 67, 69, 71 and 72). The command information being solely resident within each of the target computer systems 12, 14, 16 is relatively inaccessible and relatively unknown to the thief or interceptor of data stream 80, thereby substantially preventing the data recipient from gaining access to the actual information of each of these systems 12, 14 and 16.

Figure 3:
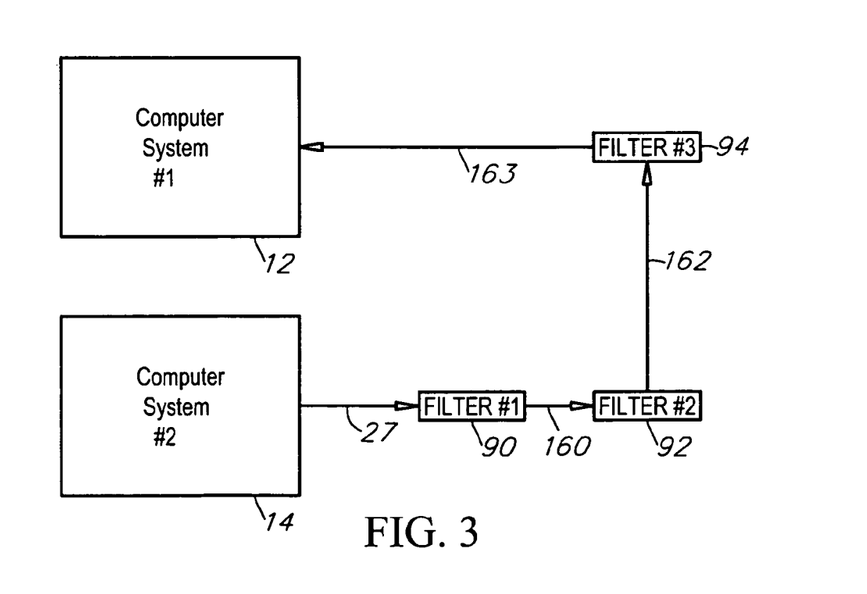
FIG. 3 is a block diagram of two of the computer systems shown in FIG. 1 communicating in a manner illustrative of a second embodiment of this invention.

Referring now to FIG. 3 there is shown yet another aspect of the present invention. Particularly, in this embodiment of the invention, a plurality of filters 90, 92, and 94 are deployed between every two of the communicating computers, such as by way of example and without limitation, between computers 12 and 14. Each filter 90, 92, 94, according to one embodiment associated with this aspect of the present invention, includes a processor (substantially similar to processor 18 and operating under stored program control), a memory portion (substantially similar to memory 19), and an input/output driver which is substantially similar to driver 20. Moreover, according to one embodiment of the present invention, the processor memory, and driver are electrically and communicatively connected in the manner shown in FIG. 1.

Particularly, each filter is adapted to receive a transmitted signal 23, 25, 27, 29, 120, 122, from any of the computer systems 12, 14, 16, and to modify the signal in a certain manner (e.g. by way of example and without limitations by performing a logical "NOT" operation on each data bit included within the received signal). Once the modified signal is received by the "target" computer system (e.g. in this example computer 12) it is changed to the original transmitted signal (e.g. by again performing a logical "NOT" operation on each of the received data bits). In this manner, unauthorized receipt of the modified signal at any stage of the transmission between the first computer system 305 and the second computer system will not allow the undesired recipient to gain knowledge of the information which was desired or which was actually transmitted by and between these two computer systems. In yet another embodiment of the invention, each filter provides and/or appends at least one "flag" or additional data bit to the received data stream to another filter and/or to the target computer system. In this manner, the target computer system has knowledge of the path that the data undertook before it arrived at the target computer system.

Figure 4:
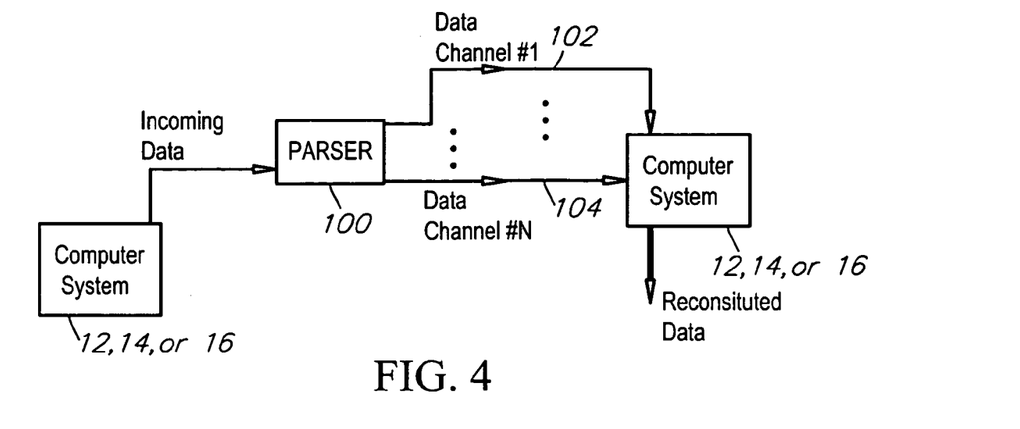
FIG. 4 is a block diagram of two of the computer systems shown in FIG. 1 communicating in a manner illustrative of a third embodiment of this invention.

Referring now to FIG. 4 there is shown yet another aspect of the present communications and computer system invention. As shown, according to this aspect of the present invention, each stream of incoming data is transmitted to and received by a parser 100. According to this aspect of the present invention the parser 100 includes a computer processor, substantially similar to processor 18 and acting under stored program control, and a memory portion substantially similar to memory 19 and which contains commands which direct the operation of the processor. In this embodiment of the invention, the incoming data stream (e.g. such as that produced by processor 18 and which is desired to be communicated to computer system 14) is split into a plurality of separate channels 102, 104. Importantly, according to this aspects of the present invention, each of these plurality of separate channels 102, 104 is independently sent or transmitted to a the "target" (e.g. any of the computer systems 12, 14 and/or 16) computer system where they are reconstituted. In this manner, unauthorized receipt of one or more of these channels will not allow the recipient to gain access to the whole of the transmitted information. It should be appreciated that this passer methodology may be employed with the previously discussed transmission of memory locations and/or with the recognition grid algorithm to provide even greater security.

Figure 8:
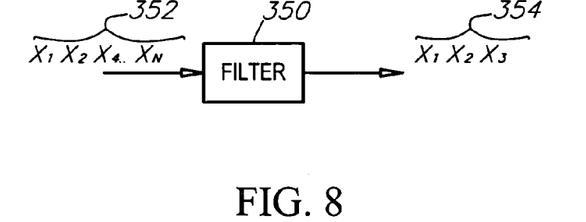
FIG. 8 is a block diagram of a filter made in accordance with an alternate embodiment of the invention.

In yet another aspect of the present invention, as shown best in FIG. 8, Filter 350, which is substantially identical to filters 90, 92, and 94 is programmed to receive a plurality of data bits 352, to analyze the data bits, and to transmit a compressed data Stream 354 having the received "valid" or operational data denoted as "$x_1$" and "$x_2$". Stream 354, is this embodiment only includes a single bit "$x_3$" representing all of the filler data represented as "$x_4 \ldots x_n$" in FIG. 8. Alternatively by way of example and without limitation Filter 350 may generate all of the filter data, "$x_4 \ldots x_n$" but compress the "real" or operation data "$x_1$" and "$x_2$" into a single bit "xZ" which the target system realizes or has a prior knowledge of. In this manner, only the target system, within processor 18, knows that xZ uniquely "maps into" or represents the data "$x_1$" and "$x_2$". A thief intercepting the "$x_2$" data would not have this mapping information. In this manner, Stream 354 may compactly communicate the filler/valid information to a target computer system.

Figure 9:
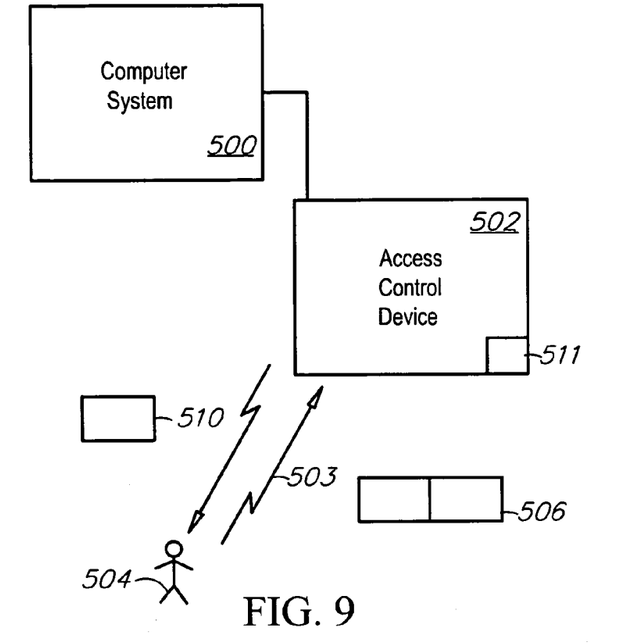
FIG. 9 is a block diagram of a computer system made in accordance with an alternate embodiment of the invention.

Referring now to FIG. 9, there is shown yet another embodiment of the invention. As shown, computer system 500, which may be substantially similar to computer systems 12, 14, 16 is electronically, physically, and communicatively coupled to access central device 502 which, in one embodiment, comprise a processor operating under stored program control.

As shown, a request for access signal 503 to compute 500 is received by device 502 from a user 504 who must provide a user identification number 506 as part of signal 503. The device 502 then matches the identification number 506 with other stored data such as the user's location, and a transmitted message code that 510 that is received from a pseudo random number generator 511. Device 502 then places a call to user 504 and communicates the code 510 to the user 504. Device 502 then waits a predetermined period of time before the code is "echoed back" by the user. If the "echo" matches, access is allowed.

Figure 10:
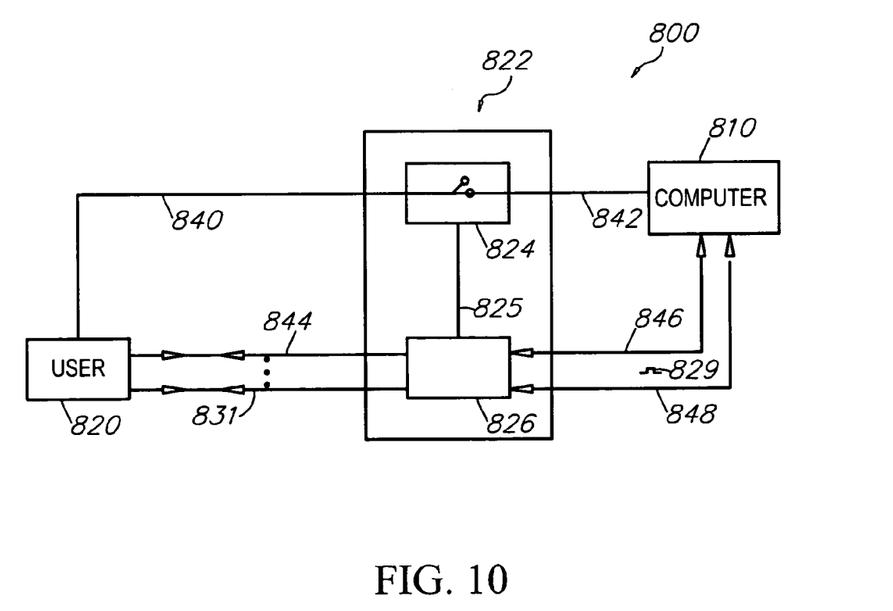
FIG. 10 is a block diagram of a computer system made in accordance with an alternate embodiment of the invention.

Referring now to FIG. 10 there is shown a computer security system 800 for use with a computer 810 which selectively communicates with a computer user 820. As should be appreciated by those of ordinary skill in the art user 820 may comprise a human and/or a computer machine and/or plurality of computers.

As shown, system 800 further includes a computer access and/or security module 822 including a switch 824 coupled to and in operable control communication, by means of communications bus 825 with a processor assembly 826 acting under stored program control.

As shown, assembly 826 selectively allows user 820 to communicate with computer 810 by the closing of switch 824, thereby allowing full duplex and/or half duplex communication through channels 840, 842. This switch 824 is closed only after receipt of a query signal on bus and/or communications channel/medium 844 which is sent to computer 810 by assembly 826 which utilizes communications channel/medium 846. Computer 810, in one embodiment, compares the signal with memory data and if a match is found communicates a signal 829 to processor 826 by means of communications channel/medium 848. User 820 must, within a certain time period, communicate signal 829 to processor 826 by means of bus and/or communications channel/medium 831. Once signal 829 has been received by processor assembly 826, switch 824 is closed, allowing communications between user 820 and computer 810, until no more signals and/or data is present on bus/communications channel/medium 840.

In an alternate embodiment, once switch 824 is initially closed, computer 810 transmits uniquely different signals along bus 848 to processor assembly 826 at separate and distinct periods and/or intervals of time. User 820, in order to keep the switch 824 closed, must similarly communicate these very same uniquely different signals to processor 826, along bus/communications channel/medium 831, at substantially the very same time. Alternatively, each query signal on busses 844/846 and match signal 829 is "logged" or recorded and stored within processor assembly 826 in order to create and maintain a system access record. In yet another aspect of the invention, query signal on bus 844/846 must specify the type of file, the identity of the information, and/or the security level requested within computer 810. A separate record of each such request is kept for historical record keeping purposes.

It is understood that changes and modifications may be made to the above- described inventions without departing from the spirit and the scope of the various inventions. Nothing in the description or in any other portion of this application is intended or shall be construed as to limit the nature and the scope of the Applicants' invention.

What is claimed is:

1. A recognition grid adapted for use with an array of memory locations, which are operatively contained within a computer, each of said memory locations having a unique addresses associated therewith, said recognition grid comprising:

an array of at least one of said unique addresses of said plurality of memory locations; and a template which is used to select said at least one of said unique addresses of said plurality of memory locations, wherein said template may be dynamically created by a second computer and transmitted to said computer by the use of a dedicated communications channel which is used only by said second computer to transmit said template to said computer.

2. The recognition grid of claim 1 wherein said template is a physical template.

3. The recognition grid of claim 1 wherein said template is a virtual template.

* * * * *